United States Patent
Butt et al.

(10) Patent No.: US 10,248,346 B2
(45) Date of Patent: Apr. 2, 2019

(54) MODULAR ARCHITECTURE FOR EXTREME-SCALE DISTRIBUTED PROCESSING APPLICATIONS

(71) Applicant: International Business Machines Corporation, Armonk, NY (US)

(72) Inventors: Ali R. Butt, Blacksburg, VA (US); Prasenjit Sarkar, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 289 days.

(21) Appl. No.: 15/073,838

(22) Filed: Mar. 18, 2016

(65) Prior Publication Data

US 2016/0202931 A1 Jul. 14, 2016

Related U.S. Application Data (63) Continuation of application No. 13/909,767, filed on Jun. 4, 2013, now Pat. No. 9,330,055.

(51) Int. Cl.
*G06F 3/06* (2006.01)
*G06F 15/173* (2006.01)
*G06F 9/50* (2006.01)

(52) U.S. Cl.
CPC ............ *G06F 3/0631* (2013.01); *G06F 3/061* (2013.01); *G06F 3/0604* (2013.01); *G06F 3/065* (2013.01);
(Continued)

(58) Field of Classification Search
CPC .................................................... G06F 3/0631
(Continued)

(56) References Cited

U.S. PATENT DOCUMENTS 4,887,076 A 12/1989 Kent et al.
5,544,342 A 8/1996 Dean
(Continued)

FOREIGN PATENT DOCUMENTS

| CN | 101577716 A | 11/2009 |
|---|---|---|
| CN | 101692227 A | 4/2010 |
| CN | 102143215 A | 8/2011 |

OTHER PUBLICATIONS

Fitzpatrick, "Distributed Caching with Memcached", 2004.*
(Continued)

*Primary Examiner* — Ondrej C Vostal
(74) *Attorney, Agent, or Firm* — Foley Hoag LLP; Erik Huestis; Stephen Kenny (57) ABSTRACT

Embodiments of the present invention relate to a new data center architecture that provides for efficient processing in distributed analytics applications. In one embodiment, a subnode of a distributed processing node is provided. The subnode includes at least one processor core operatively connected to a memory. A first interconnect operatively connects to the subnode. A second interconnect operatively connects the subnode to a storage. The storage includes a first storage unit and a second storage unit. The second storage unit has lower access time and latency than the first storage unit. A storage manager is provided that is operative to allocate data between the first and second storage units based on access patterns. The storage manager preferentially relocates non-sequentially accessed data to the second storage unit from the first storage unit.

18 Claims, 6 Drawing Sheets

(52) U.S. Cl.
CPC ............ *G06F 3/067* (2013.01); *G06F 3/0643* (2013.01); *G06F 3/0655* (2013.01); *G06F 3/0685* (2013.01); *G06F 9/5027* (2013.01); *G06F 15/17331* (2013.01)

(58) Field of Classification Search
USPC ........................................................ 718/102
See application file for complete search history.

(56) References Cited

U.S. PATENT DOCUMENTS

| | | | | |
|---|---|---|---|---|
| 6,249,802 | B1* | 6/2001 | Richardson | G06F 9/5016 709/200 |
| 6,353,836 | B1* | 3/2002 | Bamford | G06F 11/1471 |
| 6,385,624 | B1 | 5/2002 | Shinkai | |
| 6,633,891 | B1* | 10/2003 | Bamford | G06F 12/0813 |
| 7,467,238 | B2 | 12/2008 | Hosoya et al. | |
| 7,788,467 | B2 | 8/2010 | Hatakeyama | |
| 8,260,840 | B1 | 9/2012 | Sirota et al. | |
| 8,712,984 | B2* | 4/2014 | Zhang | G06F 12/121 707/705 |
| 8,751,725 | B1 | 6/2014 | Gangadharan et al. | |
| 9,043,530 | B1 | 5/2015 | Sundaram et al. | |
| 9,152,501 | B2* | 10/2015 | Belluomini | G06F 11/1415 |
| 9,648,102 | B1* | 5/2017 | Davis | G06F 15/167 |
| 2002/0083159 | A1 | 6/2002 | Ward et al. | |
| 2002/0087588 | A1 | 7/2002 | McBride et al. | |
| 2003/0084261 | A1 | 5/2003 | Byrd et al. | |
| 2004/0114580 | A1 | 6/2004 | Santry et al. | |
| 2006/0053215 | A1 | 3/2006 | Sharma | |
| 2007/0101096 | A1 | 5/2007 | Gorobets | |
| 2007/0177415 | A1 | 8/2007 | Shau | |
| 2007/0220059 | A1 | 9/2007 | Lu et al. | |
| 2008/0109569 | A1 | 5/2008 | Leonard et al. | |
| 2008/0222734 | A1 | 9/2008 | Redlich et al. | |
| 2008/0313716 | A1 | 12/2008 | Park | |
| 2009/0070518 | A1 | 3/2009 | Traister et al. | |
| 2009/0113160 | A1 | 4/2009 | Ferraro | |
| 2009/0327368 | A1 | 12/2009 | Aston et al. | |
| 2010/0131671 | A1 | 5/2010 | Kohli et al. | |
| 2010/0153771 | A1 | 6/2010 | Gordon et al. | |
| 2010/0217949 | A1 | 8/2010 | Schopp et al. | |
| 2010/0235542 | A1 | 9/2010 | Visharam et al. | |
| 2010/0281230 | A1 | 11/2010 | Rabii et al. | |
| 2010/0299553 | A1* | 11/2010 | Cen | H04L 29/08729 714/4.1 |
| 2011/0057937 | A1 | 3/2011 | Wu et al. | |
| 2011/0126045 | A1 | 5/2011 | Bennett | |
| 2011/0219411 | A1 | 9/2011 | Smith | |
| 2011/0252181 | A1* | 10/2011 | Ouye | G06F 17/30519 711/101 |
| 2012/0096211 | A1 | 4/2012 | Davis et al. | |
| 2012/0173541 | A1 | 7/2012 | Venkataramani | |
| 2012/0198466 | A1 | 8/2012 | Cherkasova et al. | |
| 2012/0210247 | A1* | 8/2012 | Khouri | G06Q 10/101 715/751 |
| 2012/0291041 | A1 | 11/2012 | Cipar et al. | |
| 2013/0138891 | A1* | 5/2013 | Chockler | G06F 9/5016 711/133 |
| 2013/0166821 | A1 | 6/2013 | Fitch et al. | |
| 2013/0227180 | A1 | 8/2013 | Bisht et al. | |
| 2013/0262394 | A1* | 10/2013 | Kumarasamy | G06F 17/30073 707/673 |
| 2013/0290462 | A1 | 10/2013 | Lim et al. | |
| 2013/0290636 | A1* | 10/2013 | Chen | G06F 12/0811 711/122 |
| 2013/0318283 | A1 | 11/2013 | Small et al. | |
| 2014/0025770 | A1 | 1/2014 | Warfield et al. | |
| 2014/0040575 | A1 | 2/2014 | Horn | |
| 2014/0059310 | A1* | 2/2014 | Du | G06F 3/065 711/162 |
| 2014/0195632 | A1 | 7/2014 | Hunter et al. | |
| 2014/0195739 | A1 | 7/2014 | Yu et al. | |
| 2014/0279825 | A1 | 9/2014 | Shukla et al. | |
| 2014/0359044 | A1* | 12/2014 | Davis | H04L 45/60 709/213 |

OTHER PUBLICATIONS

Otto, "Memcached: More Cache = Less Cash!", 2009.*
Wikipedia, "Sequential access", 2018.*
Wikipedia, "Interconnection", 2018 (Year: 2018).*
Wikipedia, "Memcached", 2018 (Year: 2018).*
Zhang et al., "YouChoose: A Performance Interface Enabling Convenient and Efficient QoS Support for Consolidated Storage Systems", 2011.
IPCOM000193146D, "Method of Creating a Componentized Architecture for Unifying Resource Sharing Scenarios in Cloud Computing Environment", published Feb. 11, 2010, 13 page with cover page.
IPCOM000215416D, "Workload Optimization through Dynamic Reconfiguration of Compute Nodes", published Feb. 26, 2012, 4 pages with cover page.

* cited by examiner

MODULAR ARCHITECTURE FOR EXTREME-SCALE DISTRIBUTED PROCESSING APPLICATIONS

BACKGROUND

Embodiments of the present invention relate to distributed processing, and more specifically, to a new data center architecture that provides for efficient processing in distributed analytics applications.

BRIEF SUMMARY

According to one embodiment of the present invention, a subnode of a distributed processing node is provided. The subnode includes at least one processor core operatively connected to a memory. A first interconnect operatively connects to the subnode. A second interconnect operatively connects the subnode to a storage. The storage includes a first storage unit and a second storage unit. The second storage unit has lower access time and latency than the first storage unit. A process runs on the subnode, the process being operative to retrieve data from the memory of the subnode. The process interrogates the memory of the subnode for requested data. If the requested data is not found in the memory of the subnode, the process interrogates the memory of at least one additional subnode of the distributed processing node via the first interconnect. If the requested data is found in the memory of the additional subnode, the process copies the requested data to the memory of the subnode. If the requested data is not found in the memory of the subnode or the memory of the additional subnode, the process interrogates the storage via the second interconnect. A storage manager is provided that is operative to allocate data between the first and second storage units based on access patterns. The storage manager preferentially relocates non-sequentially accessed data to the second storage unit from the first storage unit.

According to another embodiment of the present disclosure, a method of and computer program product for operating a distributed processing node is provided. In this embodiment, a task is allocated to a subnode of a distributed processing node. The subnode includes at least one processor core operatively connected to a memory. Data requested by the task is determined. The memory of the subnode is interrogated for the requested data. If the requested data is not found in the memory of the subnode, the memory of at least one additional subnode of the distributed processing node is interrogated via a first interconnect. If the requested data is found in the memory of the additional subnode, the requested data is copied from the memory of the additional subnode to the memory of the subnode. If the requested data is not found in the memory of the subnode or the memory of the additional subnode, a storage is interrogated via a second interconnect. The storage includes a first storage unit and a second storage unit. The second storage unit has lower access time and latency than the first storage unit. The task is processed on the at least one processor core of the subnode. Data is allocated between the first and second storage units based on access patterns, preferentially relocating non-sequentially accessed data to the second storage unit from the first storage unit.

DETAILED DESCRIPTION

The volume of data to be processed in the field of "Big Data" is growing at an unprecedented rate at the same time that analysis is becoming more computation intensive. In order to support emerging distributed processing applications, extreme-scale memory and increased computational power are required. The complexity and computation needs of such applications lead to performance bottlenecks in conventional architectures. To address this requirement, a monolithic distributed processing node may be converted into a plurality of subnodes, where each node comprises a blade server or other modular computing unit. These blade servers may be provisioned according to workload demands. Multiple blade-based subnodes within a given node may be linked by extreme scale networks to mitigate data-locality loss. In addition, a hierarchical filesystem may manage distributed data, while a cooperative memory management scheme may handle memory between subnodes within a distributed processing node. Workload trends may be used to configure and tune the blade-based subnode to achieve high resource efficiency based on its utilization.

Figure 1:
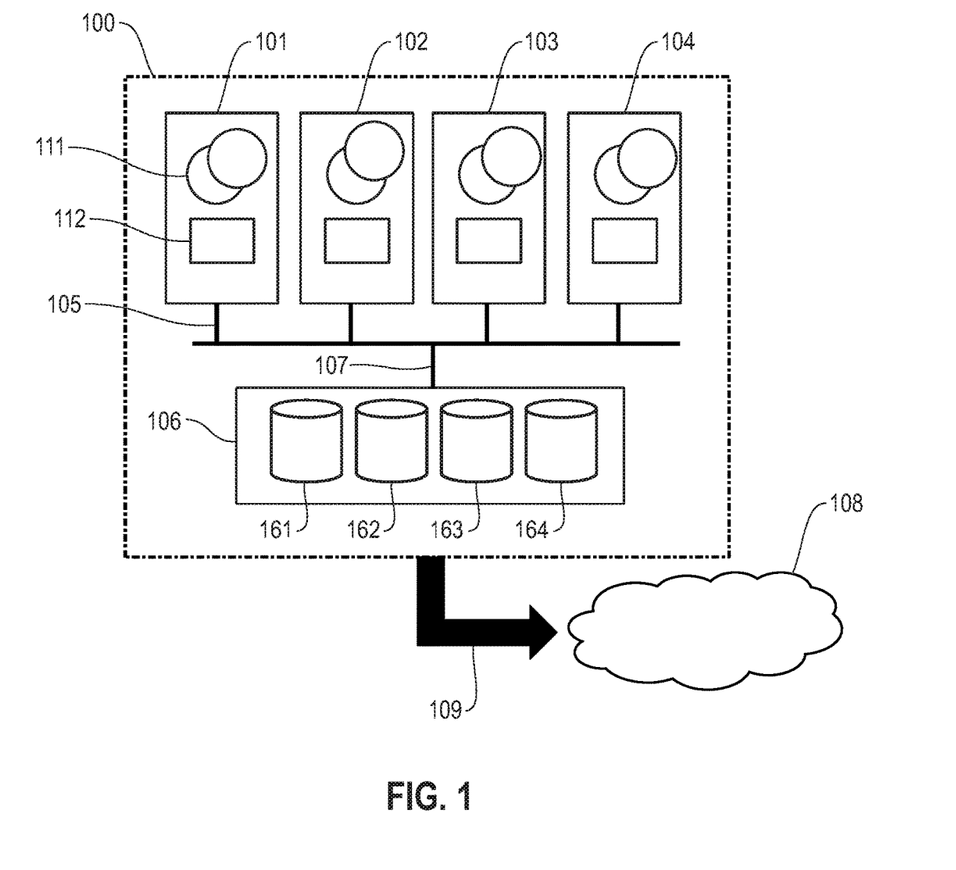
FIG. 1 is a schematic representation of a distributed processing node according to an embodiment of the present disclosure.

With reference now to FIG. 1, a distributed processing node according to an embodiment of the disclosure is shown. Node 100 may be a rack, a blade enclosure, or another computing platform supporting multiple processing subunits. Within node 100 are subnodes 101, 102, 103, 104. In some embodiments, subnodes 101, 102, 103, 104 comprise blades within a blade enclosure. In some embodiments, the number of subnodes within a node may be lower or higher according to the processing needs of a given application. In some embodiments, subnodes are dynamically added or removed from the node to accommodate fluctuating demand. Each subnode comprises at least one processor core 111 and a memory 112. In some embodiments, the processor cores are spread over several discrete processors, while in some embodiments, all cores in a given subnode are within a single multi-core processor. Processors with from one to over a hundred cores are known in the art. In some embodiments, a subnode has between 6 and 12 cores. In some embodiments, each subnode may have from 1 GB to over 24 GB of memory. In some embodiments, a portion of each memory is used for I/O buffering. In other embodiments, solid-state drives (SSDs) are used instead of or in addition to memory for I/O buffering.

Each subnode is connected to each other subnode by an interconnect 105. Each subnode is connected to consolidated storage 106 by an interconnect 107. Consolidated storage 106 may contain any number of physical storage devices 161, 162, 163, 164. Storage devices 161, 162, 163, 164 may be any physical storage device known in the art, including both magnetic and optical media. In some embodiments, storage devices 161, 162, 163, 164 are hard disk drives (HDDs). In some embodiments, consolidated storage 106 uses RAID or another storage virtualization scheme. The number of storage devices may be varied based on cost and capacity requirements. The addition of spindles to consolidated storage 106 provides higher throughput, and allows consolidation of typically bursty workload from different subnodes. Node 100 may be connected to additional distributed processing nodes 108 to form a distributed processing cluster via interconnect 109.

In some embodiments, the distributed processing node 100 is a node in a MapReduce-based distributed processing system such as Apache Hadoop. A MapReduce system allocates work across a plurality of processing nodes in a cluster through a Map step. The results from each of the distributed processing nodes are combined in a Reduce step. In Apache Hadoop, jobs are allocated between nodes by a JobTracker, based in part on the location of data required by that job. In some implementations, a job is preferentially assigned to a node with the requisite data, and failing that is assigned to a node in the same rack as the requisite data. A MapReduce-based system may include a distributed filesystem such as the Hadoop Distributed File System (HDFS). HDFS distributes data across multiple nodes in the distributed processing cluster, providing for data reliability by ensuring duplication on several nodes in several locations. HDFS nodes communicate with each other in order to rebalance data between nodes, move duplicates, and endure high availability. By determining the location of requisite data in HDFS, a work scheduler, such as the Hadoop JobTracker, may allocate work to a node that has local access to that data.

Within the node architecture of FIG. 1, the hardware configuration may be tuned for various application types. For I/O intensive applications, a low computation power to memory ratio on a subnode and a high-speed network interconnect between subnodes is desirable. For computation intensive applications, a high computation power to memory ratio and a standard network interconnect between subnodes is desirable. For mixed applications, a mix of differently configured subnodes is desirable. When a mix of subnode configurations are available, work may be preferentially scheduled to those nodes most appropriate to the nature of the work. In addition, a large memory coupled with a prefetch cache is desirable in mixed applications in order to absorb I/O bursts.

The number of subnodes per node may also be tuned for a given application. For example, a configuration in which there are more subnodes per node is optimized for larger jobs. A configuration in which there are fewer subnodes per node is optimized for smaller jobs. Resource fragmentation may occur as the number of subnodes per node rises. In particular, if more subnodes are added per node, some may remain idle if a job does not need the available resources. Resource fragmentation may be minimized by employing node-level multi-tenancy.

Figure 2:
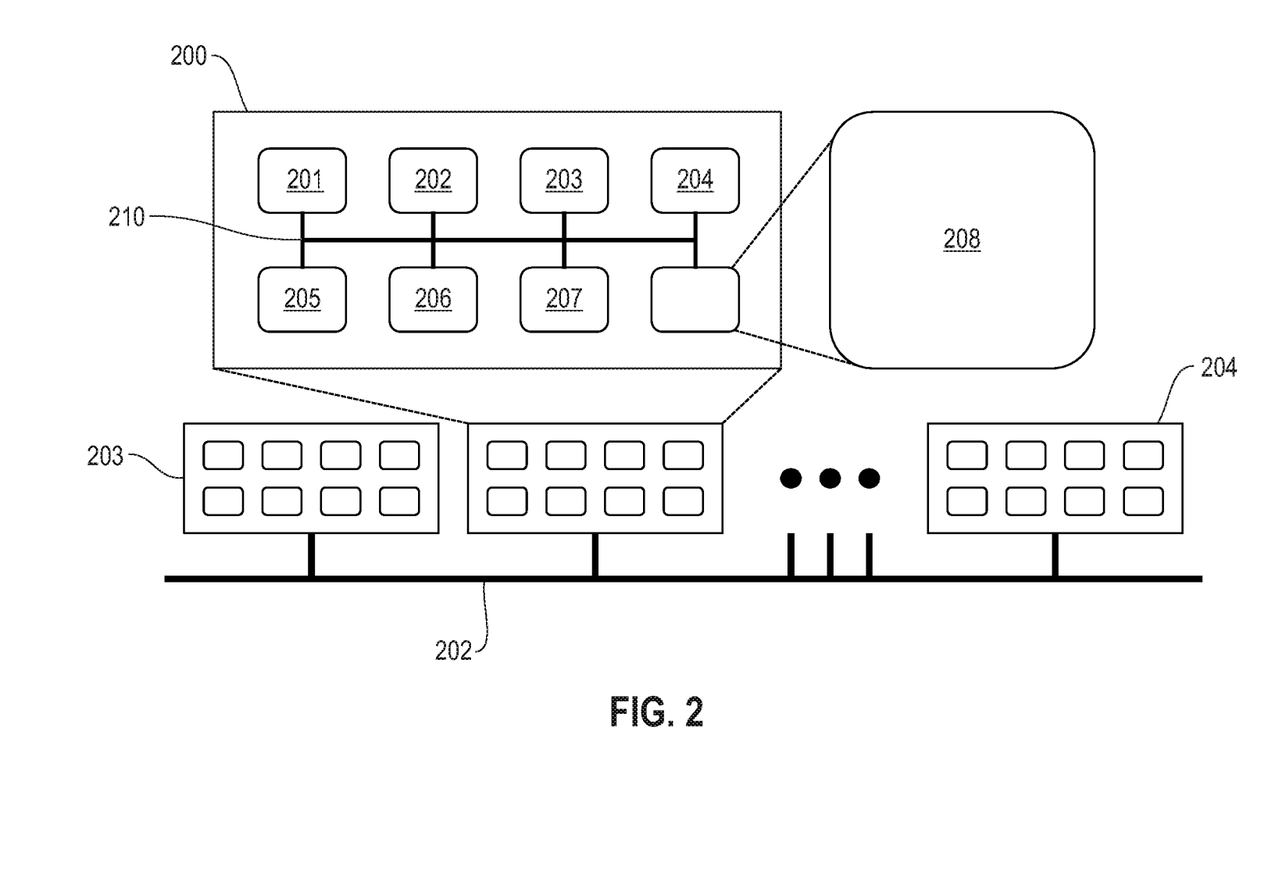
FIG. 2 is a schematic representation of a distributed processing cluster according to an embodiment of the present disclosure.

FIG. 2 shows an exemplary arrangement of a plurality of distributed processing nodes within a distributed processing cluster. The cluster contains one or more racks 200, 203, 204. Rack 200 contains one or more distributed processing nodes 201-208. Distributed processing node 208 may be a node such as node 100 as described with regard to FIG. 1 above, or a node such as described with regard to FIG. 3 below. Nodes within a rack are connected by interconnect 210. Multiple additional racks 203, 204, each having its own resident nodes, are connected by interconnect 202. Nodes within rack 200 and within other racks 203, 204 may be Hadoop nodes. In some embodiments, there is only one node 208 per rack 200. In such embodiments, interconnect 210 may be omitted, and nodes on multiple racks may be connected through interconnect 202. In some embodiments, nodes 201-208 are connected to a network switch in the rack 200, and multiple racks 200, 203, 204 form a tree hierarchy. In some embodiments, data is managed by running HDFS on all disks at the node level.

Figure 3:
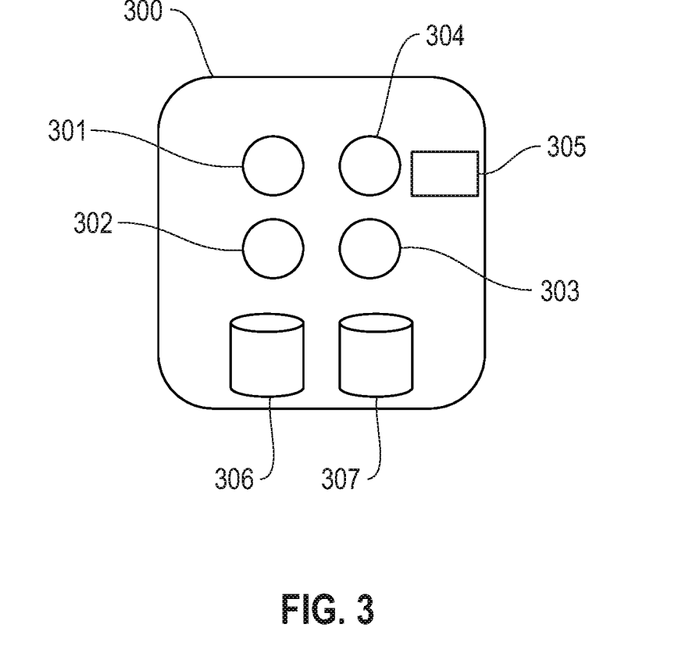
FIG. 3 is a schematic representation of a distributed processing node according to an embodiment of the present disclosure.

FIG. 3 shows an exemplary alternative node lacking the subnode structure described above with regard to FIG. 1. Node 300 includes one or more processing cores 301, 302, 303, 304, a memory 305, and one or more physical storages 306, 307. As the demand on an individual distributed processing node 300 increases, memory per node, cores per node, and disks per node must be increased to provide additional capacity. In addition, the interconnect between the various nodes must be provisioned to accommodate larger data throughput. In particular, where node 300 is a Hadoop node or another distributed processing node utilizing the Hadoop Distributed File System (HDFS), the network must be provisioned to support I/O-intensive shuffle phases. Other distributed file systems have similar capacity requirements. Inter-rack and intra-rack networks have to be provisioned differently to accommodate different latency/bandwidth requirements at the different levels. In some embodiments, each node 300 in a distributed processing cluster has a similar amount of memory, number of processors and local disks.

Emerging computation and data intensive applications require a rapid increase in the resources needed at distributed processing nodes. The node architecture shown in FIG. 1 provides for more flexible expansion than the node architecture shown in FIG. 3. In particular, increased use of memory can create a bottleneck in distributed processing systems such as Hadoop. Allocating too much memory to a node such as that depicted in FIG. 3 also results in an undesirable cost per node. Node 100 of FIG. 3 overcomes these issues by leveraging recent increases in node-to-node bandwidth and internal network speeds.

Node 100 exploits fast-growing network bandwidth to create a distributed-blade server within a single distributed processing node (such as a Hadoop node). The fast interconnect 105 between subnodes 101, 102, 103, 104 may be used to create a large consolidated-memory pool across several subnodes, which can be accessed at almost-local-memory-access speeds by any one of the subnodes 101, 102, 103, 104 within a node 100. By allocating each subnode 101, 102, 103, 104 to a blade or similar computing unit, node 100 is based on commodity hardware and avoids custom components. The result is reduced costs, increased maintainability, and increased flexibility.

By providing individual memory 112 within each modular subnode 101, a better computation to memory ratio is provided than in monolithic multiple core systems. Interconnect 107 may be over-provisioned to support faster access to storage 106. Interconnect 105 may likewise be over-provisioned to support fast memory access between subnodes 101, 102, 103, 104. In particular, subnodes may support peer-to-peer memory interactions via interconnect 105. In some embodiments, interconnect 105 and 107 are branches of the same interconnect, such as a fiber network within a blade enclosure or rack.

The modular node architecture of FIG. 1 avoids the constraints imposed by limited capacity nodes such as that depicted in FIG. 3. In addition, when operating within a Hadoop cluster, node 100 allows distributed processing while leveraging standard MapReduce implementations for job scheduling and standard distributed filesystems such as HDFS.

Figure 4:
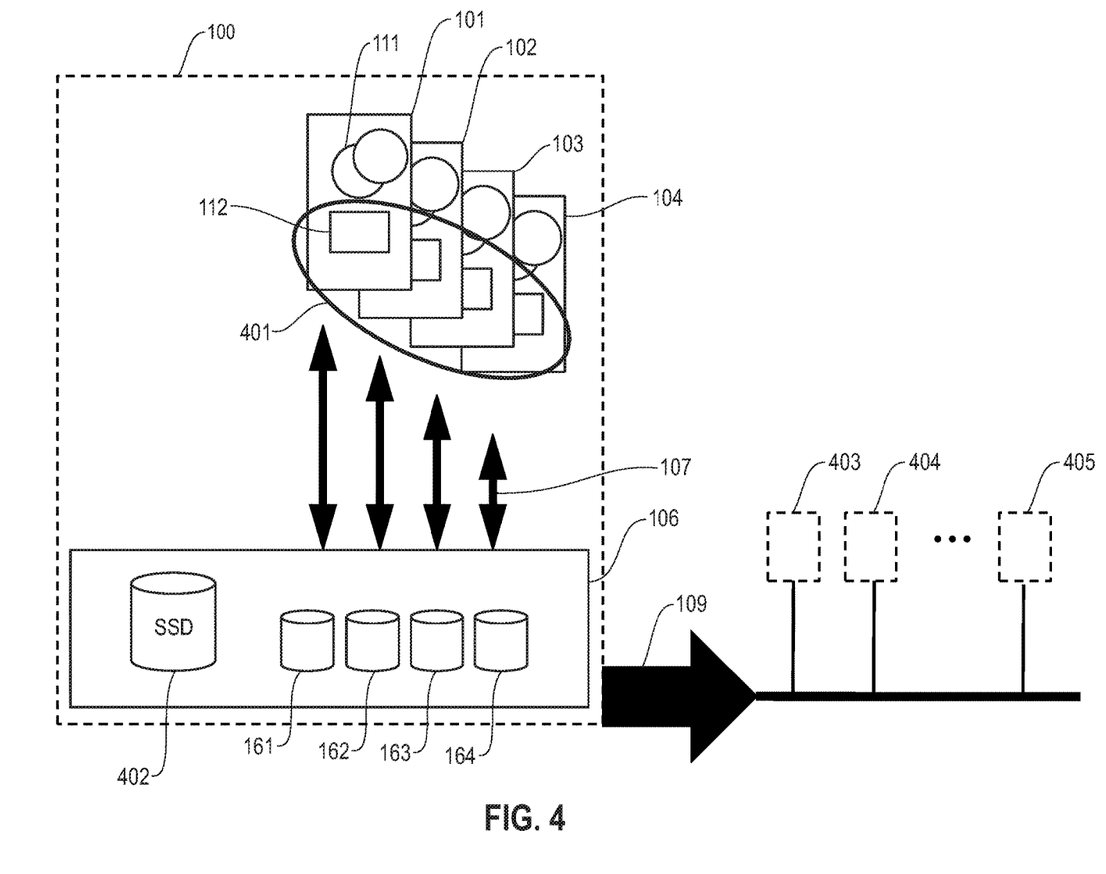
FIG. 4 is an alternative view of a distributed processing node according to an embodiment of the present disclosure.

FIG. 4 provides an alternate view of a node 100 according to an embodiment of the present disclosure. Node 100 includes 4 subnodes (blades or other computation units) 101, 102, 103, 104. Each subnode includes eight processor cores 111, and each subnode includes 4 gigabytes of memory 112 per core. The memories 112 of each subnode together form a cooperative cache 401. Each subnode accesses disks 161, 162, 163, 164 through interconnect 107. In some embodiments, the data on disks 161, 162, 163, 164 are striped. The particular core, memory and disk counts are provided for example only, and any computation unit (or blade) configuration known in the art may be integrated into the architecture described. Storage 106 additionally includes SSD 402. SSD 402 has lower access time and latency than disks 161, 162, 163, 164, forms an I/O cache for data access over interconnect 107. The SSD 402 I/O cache may be supplemental to an I/O cache within memory 112 to form a multi-level cache, or may be used in place of a memory-based cache. In the case of a multi-level cache, SSDs are used for supporting high-throughput storage by handling spill-over from memory as buffers rather than as storage. In some embodiments, SSD 402 provides a prefetch cache. In some embodiments a cache manager manages the cache on SSD 402. The cache manager may be a kernel module operating on processor 111. In some embodiments, the cache manager applies a pattern-based cache policy. In some embodiments, the cache policy is to retain sequentially accessed data on disks 161, 162, 163, 164 while copying randomly accessed data to SSD 402. Node 100 communicates with other nodes 403, 404, 405 in the cluster via interconnect 109, which in some embodiments is a dual 10 Gbps link.

Figure 5:
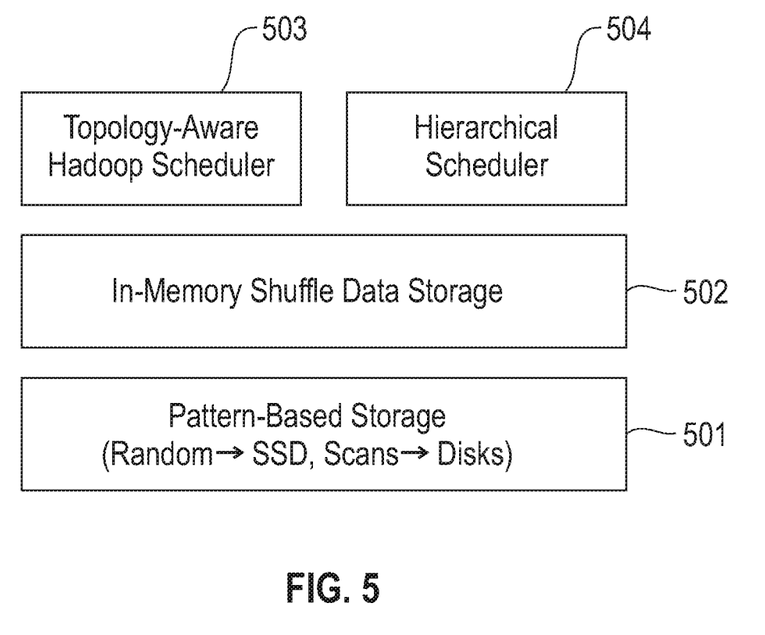
FIG. 5 is a logical view of a distributed processing node according to an embodiment of the present disclosure.

FIG. 5 depicts a logical architecture for a Hadoop node according to an embodiment of the disclosure. Pattern-based storage subsystem 501 maintains randomly accessed data in SSD, and directs scan access to HDDs. Memory storage subsystem 502 maintains HDFS shuffle data in memory. Topology-aware Hadoop scheduler 503 allocates work among Hadoop nodes based on data locality and network topology among nodes. In some embodiments, Topology-aware Hadoop scheduler 503 is a Hadoop JobTracker. Hierarchical scheduler 504 allocates work among the subnodes of a node based on the data locality within the node. In particular, hierarchical scheduler 504 considers the location of data within a cooperative cache or shared memory.

In a distributed processing system, such as one implementing MapReduce, task workload may become skewed. Unequal distribution of workload may cause individual node memories to become overwhelmed. By providing a cooperative cache among the memories of subnodes within a distributed processing node, memory is consolidated and consumption is more evenly allocated over the resources available. To accommodate this approach, memory content management and memory architecture are separated by the implementation of a suitable caching policy. One potential caching policy would be an all-or-nothing policy, in which data for all work (such as a Hadoop task) is made available in memory at the expense of the ability to perform other work (or other Hadoop tasks).

However, maintaining too much memory causes complex failures, data consistency and robustness issues, and energy issues, and may require costly specialized components. Instead, hierarchical HDFS may be used to manage the subnode memory in a transparent way and preserve balanced utilization of network, memory and disk. In-memory solutions to storage I/O limitations such as RDD, RamCloud, and memcached also increase memory requirements substantially, leading to many of the same problems.

Addition of more cores per node in a conventional system leads to congestion in I/O and increased distance to storage. A distributed processing application may require 1 Gb/s per core, which would saturate interconnects reaching distant data. This exacerbates the storage wall in such deployments. The present architecture allows the addition of cores in a node while staying close to storage.

Figure 6:
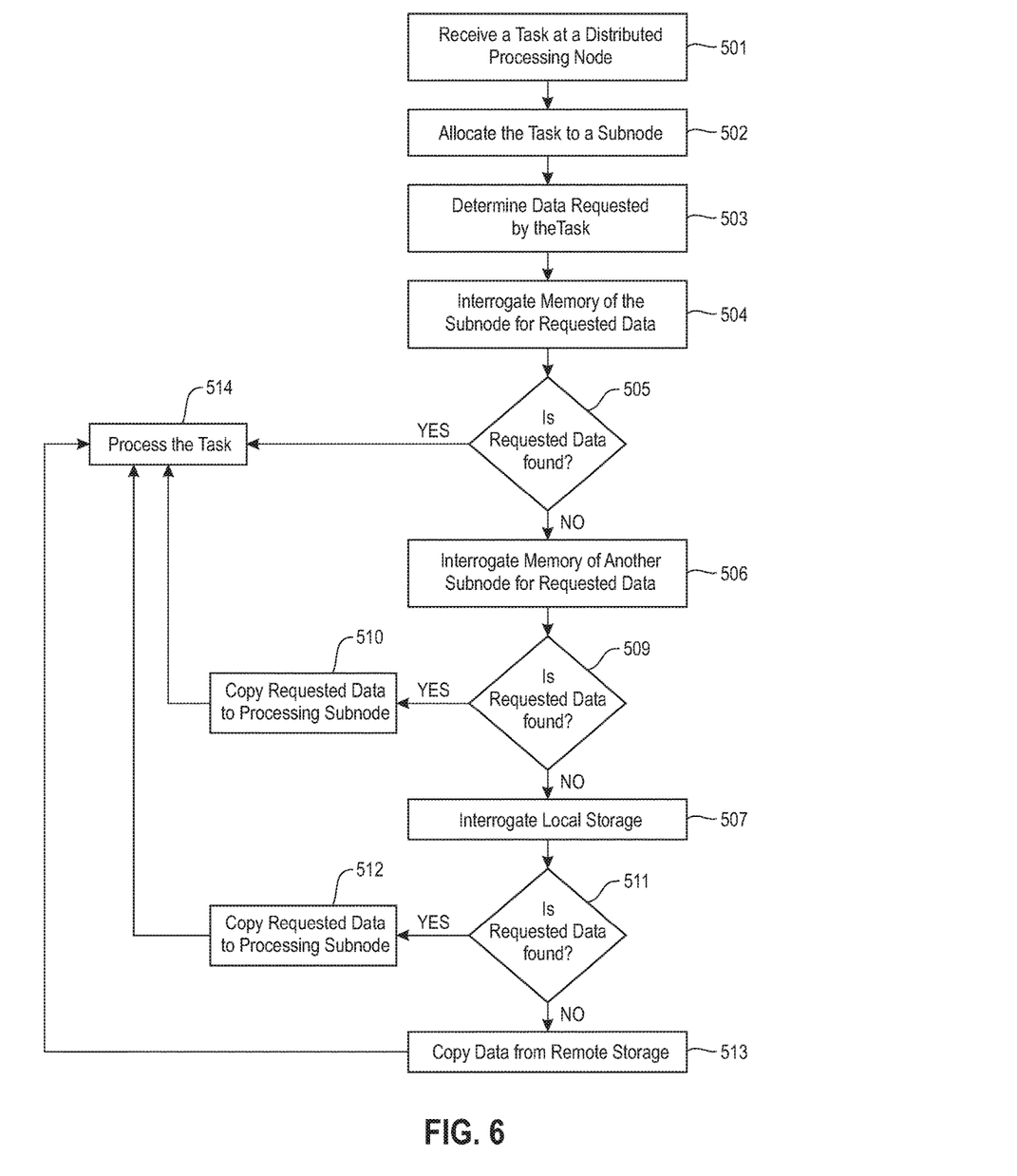
FIG. 6 illustrates a method of operating a distributed processing node according to an embodiment of the present disclosure.

FIG. 6 illustrates a method of operating a distributed processing node according to an embodiment of the present disclosure. According to one embodiment of the disclosure, a task is received at a distributed processing node 501. The task is allocated to a subnode of the distributed processing node 502 for processing on a processor. The data requested by the task is determined 503. In some embodiments, the requested data is determined at runtime by the subnode, while in some embodiments, information regarding the requested data is known in advance and included with the task. In some embodiments, step 503 is performed prior to step 502, and the requested data determines the subnode to which the task is allocated. The subnode interrogates its memory for the requested data 504. If it is found 505, then the task is processed by the processor of the subnode 514. If the data is not found 505 in the memory of the subnode, then the memories of other subnodes of the node are interrogated 506. If the data is found in the memories of other subnodes of the node 509, then it is copied to the subnode to which the task is assigned 510 and the processor of the subnode processes the task 514. If the data is not found in the memories of other subnodes 509, then then subnode interrogates storage local to the node 507. If the data is found, then it is copied to the memory of the subnode to which the task is allocated 512 and the processor processes the task 514. If the data is not found in local storage, then it is copied from remote storage 513 and the processor processes the task 514.

Although the node architectures discussed above are suitable for use in distributed processing systems such as Hadoop, the node architectures of the present disclosure offer a flexible and extensible compute/memory/storage approach that is also suitable for a diverse range of additional applications. For example, the disclosed node architectures may be used for: HPC workloads; database back-end servers; high-performance virtualization hardware; energy-efficient server design, wherein individual subnodes (blades or other computation units) are selectively turned on and off based on demand; general purpose computing servers with a hybrid mix of applications, wherein differently provisioned subnodes (blades or other computation units) can support applications best suited for their needs, e.g., via extension of individual subnodes with accelerators, GPUs, and other supplemental hardware.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a subnode of a distributed processing node, the subnode including:
        at least one processor core operatively connected to a memory, the memory being managed by Memcached;
        a first interconnect operatively connected to the subnode;
        a second interconnect operatively connected to the subnode and to a storage, the storage comprising a first storage unit and a second storage unit, the second storage unit having lower access time and latency than the first storage unit, the storage being accessed via a Hadoop Distributed File System;
a process running on the subnode, the process being operative to retrieve data from the memory of the subnode;
wherein:
the process interrogates the memory of the subnode for requested data;
if the requested data is not found in the memory of the subnode, the process interrogates the memory of at least one additional subnode of the distributed processing node via the first interconnect;
if the requested data is found in the memory of the additional subnode, the process copies the requested data to the memory of the subnode; and
if the requested data is not found in the memory of the subnode or the memory of the additional subnode, the process interrogates the storage via the second interconnect;
a storage manager allocates data between the first and second storage units based on access patterns, the storage manager preferentially relocating nonsequentially accessed data to the second storage unit from the first storage unit.

2. The system of claim 1, wherein the distributed processing node is one of a plurality of distributed processing nodes forming a distributed processing cluster, each of the plurality of distributed processing nodes being operatively connected to a third interconnect.

3. The system of claim 1, wherein the first storage unit comprises a hard disk drive and the second storage unit comprises a solid-state drive, the hard disk drive including sequential data and the solid-state drive including non-sequential data.

4. The system of claim 1, wherein the first interconnect has higher bandwidth than the second interconnect.

5. The system of claim 2, wherein the first interconnect has higher bandwidth than the third interconnect.

6. The system of claim 1, wherein the memory of the subnode participates in a cooperative cache or a shared memory.

7. The system of claim 1, wherein the distributed processing node is a Hadoop node.

8. The system of claim 2, wherein the cluster is a Hadoop cluster.

9. The system of claim 1, wherein the first interconnect is overprovisioned.

10. The system of claim 1, wherein if the requested data is found in the storage, the process copies the requested data to the memory of the subnode.

11. The system of claim 1, wherein the process is further operative to propagate changed data between the memory of the subnode and the storage.

12. The system of claim 1, further comprising a task scheduler operative to allocate the process to the subnode when the subnode has the most requested data in its memory as compared to other subnodes.

13. The system of claim 1, wherein the first storage unit comprises a hard disk drive and the second storage unit comprises a solid-state drive, the hard disk drive including sequential data and the solid-state drive including non-sequential data.

14. A method comprising:
allocating a task to a subnode of a distributed processing node, the subnode including at least one processor core operatively connected to a memory, the memory being managed by Memcached;
determining data requested by the task;
interrogating the memory of the subnode for the requested data;
if the requested data is not found in the memory of the subnode, interrogating the memory of at least one additional subnode of the distributed processing node via a first interconnect;
if the requested data is found in the memory of the additional subnode, copying the requested data from the memory of the additional subnode to the memory of the subnode;
if the requested data is not found in the memory of the subnode or the memory of the additional subnode, interrogating a storage via a second interconnect, the storage comprising a first storage unit and a second storage unit, the second storage unit having lower access time and latency than the first storage unit, the storage being accessed via a Hadoop Distributed File System; and
processing the task on the at least one processor core of the subnode;
allocating data between the first and second storage units based on access patterns, preferentially relocating non-sequentially accessed data to the second storage unit from the first storage unit.

15. The method of claim 14, wherein the distributed processing node is one of a plurality of distributed processing nodes forming a distributed processing cluster, each of the plurality of distributed processing nodes being operatively connected to a third interconnect.

16. The system of claim 14, wherein the first storage unit comprises a hard disk drive and the second storage unit comprises a solid-state drive, the hard disk drive including sequential data and the solid-state drive including non-sequential data.

17. A computer program product for distributed data processing, the computer program product comprising a non-transitory computer readable storage medium having program code embodied therewith, the program code executable by a processor to:
allocate the task to a subnode of a distributed processing node, the subnode including at least one processor core operatively connected to a memory, the memory being managed by Memcached;
determine data requested by the task;
interrogate the memory of the subnode for the requested data;
if the requested data is not found in the memory of the subnode, interrogate the memory of at least one additional subnode of the distributed processing node via a first interconnect;
if the requested data is found in the memory of the additional subnode, copy the requested data from the memory of the additional subnode to the memory of the subnode;
if the requested data is not found in the memory of the subnode or the memory of the additional subnode, interrogate a storage via a second interconnect, the storage comprising a first storage unit and a second storage unit, the second storage unit having lower access time and latency than the first storage unit, the storage being accessed via a Hadoop Distributed File System; and
process the task on the at least one processor core of the subnode;

allocate data between the first and second storage units based on access patterns, preferentially relocating non-sequentially accessed data to the second storage unit from the first storage unit.

18. The computer program product of claim 17, wherein the distributed processing node is one of a plurality of distributed processing nodes forming a distributed processing cluster, each of the plurality of distributed processing nodes being operatively connected to a third interconnect.

* * * * *